United States Patent
Yang

(10) Patent No.: US 10,860,425 B2
(45) Date of Patent: Dec. 8, 2020

(54) METHOD FOR RECOVERING BASIC INPUT/OUTPUT SYSTEM IMAGE FILE OF A COMPUTER SYSTEM AND THE COMPUTER SYSTEM

(71) Applicant: MITAC COMPUTING TECHNOLOGY CORPORATION, Hsinchu (TW)

(72) Inventor: Shun-Chieh Yang, Taoyuan (TW)

(73) Assignee: MITAC COMPUTING TECHNOLOGY CORPORATION, Hsinchu (TW)

(*) Notice: Subject to any disclaimer, the term of this patent is extended or adjusted under 35 U.S.C. 154(b) by 173 days.

(21) Appl. No.: 15/971,118

(22) Filed: May 4, 2018

(65) Prior Publication Data

US 2018/0322013 A1 Nov. 8, 2018

(30) Foreign Application Priority Data

May 5, 2017 (TW) .............................. 106114909 A

(51) Int. Cl.
*G06F 9/4401* (2018.01)
*G06F 11/14* (2006.01)
*G06F 8/654* (2018.01)

(52) U.S. Cl.
CPC .......... *G06F 11/1417* (2013.01); *G06F 8/654* (2018.02); *G06F 9/4403* (2013.01); *G06F 11/1433* (2013.01)

(58) Field of Classification Search
CPC .................................................. G06F 11/1417
See application file for complete search history.

(56) References Cited

U.S. PATENT DOCUMENTS

| 2012/0079260 A1* | 3/2012 | Yin ...................... G06F 11/1417 713/2 |
| 2014/0344431 A1* | 11/2014 | Hsu ........................ H04L 41/044 709/223 |
| 2015/0067311 A1* | 3/2015 | Forristal ............. G06F 11/1433 713/2 |

* cited by examiner

*Primary Examiner* — Kim Huynh
*Assistant Examiner* — Eric Chang
(74) *Attorney, Agent, or Firm* — Brinks Gilson & Lione

(57) ABSTRACT

A method for recovering a basic input/output system (BIOS) image file of a computer system is provided. The method includes steps of: controlling a switch unit of the computer system to switch from a first state to a second state when the BIOS image file is to be updated; reading a current BIOS image file so as to store the same as a backup; controlling the switch unit to switch back to the first state; determining whether a command is received within a first predetermined time period when the BIOS image file is successfully updated to a new version of the BIOS image file; and when negative, controlling the switch unit to switch to the second state and writing the backup of the current version of the BIOS image file.

15 Claims, 5 Drawing Sheets

METHOD FOR RECOVERING BASIC INPUT/OUTPUT SYSTEM IMAGE FILE OF A COMPUTER SYSTEM AND THE COMPUTER SYSTEM

CROSS-REFERENCE TO RELATED APPLICATION

This application claims priority to Taiwanese Patent Application No. 106114909, filed on May 5, 2017.

FIELD

The disclosure relates to a method for recovering basic input/output system (BIOS) image file of a computer system and the computer system.

BACKGROUND

Generally, a computer system is booted up with a BIOS image file stored in a flash memory of the computer system. In this field, it is needed to update the BIOS image file from time to time in order to improve the working efficiency of the computer system. However, when an updating procedure of the BIOS image file is interrupted or failed, the computer system may be unable to be booted up due to damage of the original BIOS image file. To deal with this problem, the computer system is configured to implement a built-in function for recovering the BIOS image file to a default version, or a recording device (burner) is used to record (burn) onto the flash memory the default version of the BIOS image file used to recover the BIOS image file. However, both of the above-mentioned methods for recovering the BIOS image file of the computer system require a maintenance technician to recover the BIOS image file on site, and the BIOS image file recovered by the above-mentioned methods will be the default version, rather than the latest version just before the updating procedure. This causes inconvenience to a user of the computer system.

SUMMARY

Therefore, an object of the present disclosure is to provide a method for recovering basic input/output system (BIOS) image file of a computer system.

According to one aspect of the present disclosure, a method for recovering a BIOS image file of a computer system is provided. The computer system includes a flash memory for storing a current version of the BIOS image file, a processor, a baseboard management controller (BMC), a control chipset electrically connected between the processor and the BMC, and a switch unit electrically connected among the flash memory, the control chipset and the BMC. The method includes steps of:

when the BIOS image file is to be updated, outputting, by the processor, a first command to be received by the BMC via the control chipset;

upon receipt of the first command, controlling, by the BMC, the switch unit to switch from a first state to a second state, the switch unit being in the first state by default and electrically connecting the flash memory and the control chipset and electrically disconnecting the flash memory from the BMC in the first state, the switch unit electrically connecting the flash memory and the BMC and electrically disconnecting the flash memory from the control chipset in the second state;

reading, by the BMC, the current version of the BIOS image file from the flash memory so as to store the same in the BMC as a backup;

after the current version of the BIOS image file is stored in the BMC, controlling, by the BMC, the switch unit to switch from the second state to the first state;

determining, by the BMC, whether a second command that is outputted by the processor when the BIOS image file stored in the flash memory is successfully updated to a new version of the BIOS image file is received within a first predetermined time period; and when it is determined that the second command is not received within the first predetermined time period, by the BMC, controlling the switch unit to switch from the first state to the second state and writing the current version of the BIOS image file stored therein into the flash memory.

According to another aspect of the present disclosure, a method for recovering a BIOS image file of a computer system is provided. The computer system communicates with a remote server that stores a new version of the BIOS image file via a communication network, and includes a flash memory for storing a current version of the BIOS image file, a processor, a BMC, a control chipset electrically connected between the processor and the BMC, and a switch unit electrically connected among the flash memory, the control chipset and the BMC. The method includes steps of:

when the BIOS image data of the computer system is to be updated, controlling, by the BMC, the switch unit to switch from a first state to a second state, the switch unit being in the first state by default and electrically connecting the flash memory and the control chipset and electrically disconnecting the flash memory from the BMC in the first state, the switch unit electrically connecting the flash memory and the BMC and electrically disconnecting the flash memory from the control chipset in the second state;

reading, by the BMC, the current version of the BIOS image file from the flash memory so as to store the same in the BMC as a backup;

reading, by the BMC, the new version of the BIOS image file from the remote server so as to store the new version of the BIOS image file in the flash memory to overwrite the current version of the BIOS image file;

determining, by the BMC, whether the BIOS image file stored in the flash memory is successfully updated to the new version of the BIOS image file; and when it is determined that the BIOS image file stored in the flash memory is not successfully updated, writing, by the BMC, the current version of the BIOS image file stored therein into the flash memory.

According to still another aspect of the present disclosure, a computer system including a flash memory, a control chipset, a processor, a switch and a BMC is provided.

The flash memory stores a current version of a BIOS image file of the computer system. The control chipset is configured to be electrically connected to a storage device that stores a new version of the BIOS image file. The processor is electrically connected to the control chipset, and is configured to output a first command when the BIOS image file is to be updated. The switch unit includes a first terminal electrically connected to the flash memory, a second terminal electrically connected to the control chipset, a third terminal, and a control terminal. The switch unit is operable to switch between a first state, in which the first terminal and the second terminal are conducted, and a second state, in which the first terminal and the third terminal are conducted. The switch unit is configured to operate in the first state by default. The BMC is electrically connected to the third terminal and the control terminal of the switch unit, is electrically connected to the control chipset through a transmission interface therebetween, and is configured to output a control signal to the control terminal so as to control the switch unit to switch between the first state and the second state.

Upon receipt of a first command from the processor through the control chipset and the transmission interface, the BMC outputs the control signal to the control terminal to control the switch unit to switch from the first state to the second state for electrically connecting the flash memory and the BMC and electrically disconnecting the flash memory from the chipset, and reads the current version of the BIOS image file from the flash memory so as to store the same therein as a backup.

After the current version of the BIOS image file is stored in the BMC, the BMC outputs the control signal to the control terminal to control the switch unit to switch from the second state to the first state for electrically connecting the flash memory and the control chipset and electrically disconnecting the flash memory from the BMC, and the processor controls the control chipset to read the new version of the BIOS image file from the storage device and to store the new version of the BIOS image file in the flash memory to overwrite the current version of the BIOS image file.

When the BIOS image file stored in the flash memory is not successfully updated, the BMC outputs the control signal to the control terminal to control the switch unit to switch from the first state to the second state, and writes the current version of the BIOS image file stored in the BMC into the flash memory.

BRIEF DESCRIPTION OF THE DRAWINGS

Other features and advantages of the present disclosure will become apparent in the following detailed description of the embodiments with reference to the accompanying drawings, of which.

DETAILED DESCRIPTION

Figure 1:
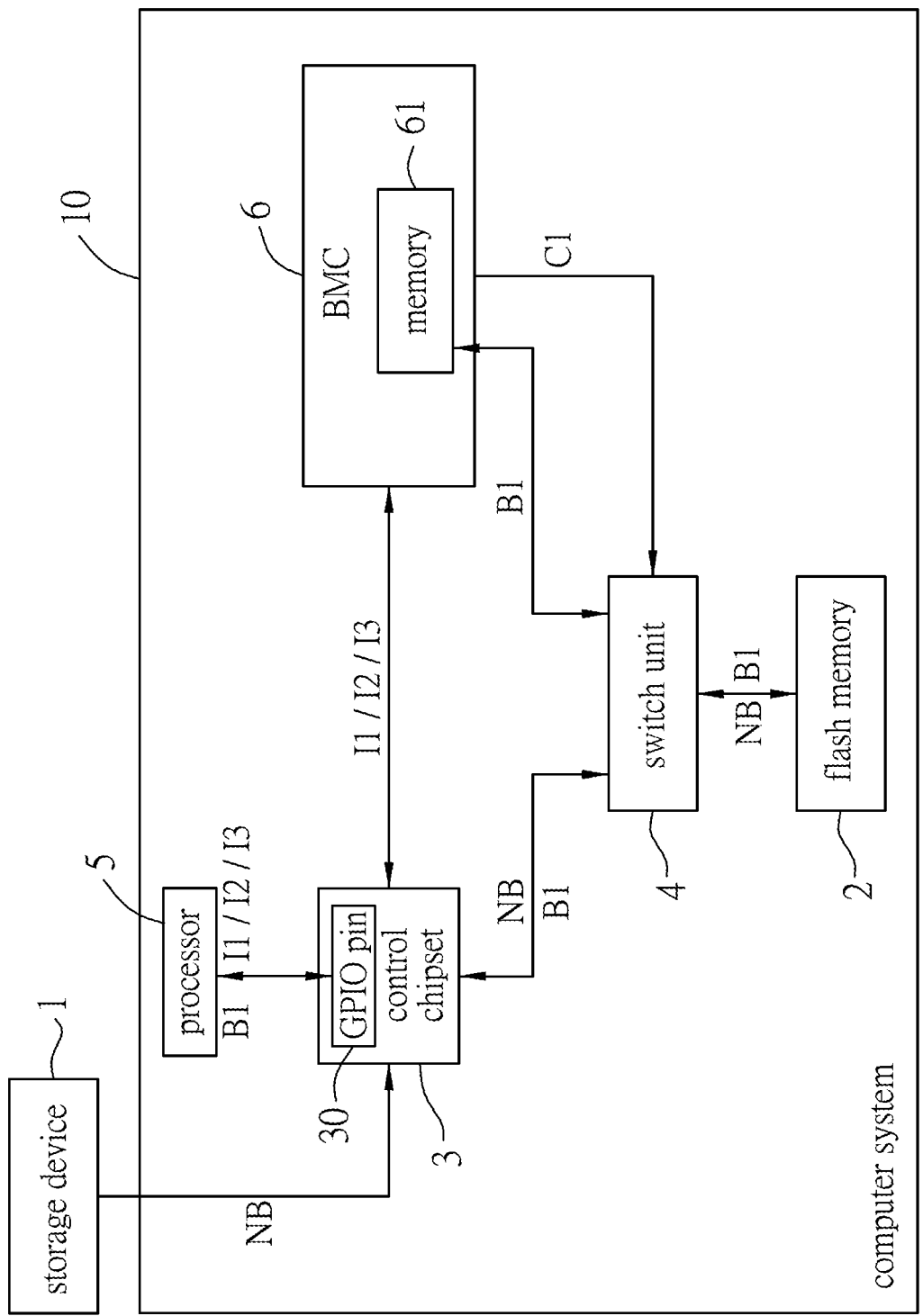
FIG. 1 is a schematic block diagram of a computer system according to an embodiment of the present disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIG. 1, a computer system 10 according to an embodiment of this disclosure includes a flash memory 2, a control chipset 3, a processor 5, a switch unit 4 and a baseboard management controller (BMC) 6. In one embodiment, the computer system 10 is a server.

The flash memory 2 stores a current version of a basic input/output system (BIOS) image file (B1) of the computer system 10. The control chipset 3 is electrically connected to a storage device 1 that stores a new version of the BIOS image file (NB) used to update BIOS image file (B1). The control chipset 3 includes a general purpose input and output (GPIO) pin 30 that is electrically connected to the processor 5. In this embodiment, the control chipset 3 is implemented by a platform controller hub (PCH), and the present disclosure is not limited to this respect.

The processor 5 is configured to output a first command (I1) when the BIOS image file is to be updated. In one embodiment, the first command (I1) is an original equipment manufacturing command (OEMC) defined by intelligent platform management interface (IPMI). For example, the processor 5 outputs the first command (I1) upon receiving an external updating command (not shown) from the control chipset 3, or, right before updating the BIOS. In one embodiment, the external updating command may be generated and outputted by the storage device 1 or by a keyboard (not shown) electrically connected to the control chipset 3.

The switch unit 4 includes a first terminal electrically connected to the flash memory 2, a second terminal electrically connected to the control chipset 3, and a third terminal and a control terminal electrically connected to the BMC 6. The switch unit 4 is operable to switch between a first state and a second state. In the first state, the first and second terminals are conducted, and the first and third terminals are not conducted, so that the switch unit 4 electrically connects the flash memory 2 and the control chipset 3 and electrically disconnects the flash memory 2 from the BMC 6. In the second state, the first and third terminals are conducted, and the first and second terminals are not conducted, so that the switch unit 4 electrically connects the flash memory 2 and the BMC 6 and electrically disconnects the flash memory 2 from the control chipset 3. The switch unit 4 is configured to operate in the first state by default. Namely, when the computer system 10 is booted up, the switch unit 4 is in the first state, and the processor 5 reads the current version of the BIOS image file (B1) stored in the flash memory 2 through the control chipset 3 and the switch unit 4, and executes the current version of the BIOS image file (B1) so as to boot the computer system 10.

The BMC 6 is electrically connected to the control chipset 3 through a transmission interface (not shown) therebetween. In this embodiment, the BMC 6 includes a memory 61 electrically connected to the third terminal of the switch unit 4. Note that the BMC 6 is configured to receive the first command (I1) from the processor 5 through the transmission interface and the control chipset 3. The BMC 6 is configured to output a control signal (C1) to the control terminal of the switch unit 4 so as to control the switch unit 4 to switch between the first state and the second state. In this embodiment, the transmission interface is a low pin count bus interface (LPCBI) and thus the BMC 6 and the control chipset 3 both conform to a low pin count (LPC) transmission protocol, and the disclosure is not limited in this respect. In this embodiment, the memory 61 electrically connected to the third terminal of the switch unit 4 is for storing as a backup the current version of the BIOS image file (B1) read by the BMC 6 from the flash memory 2.

Figure 2:
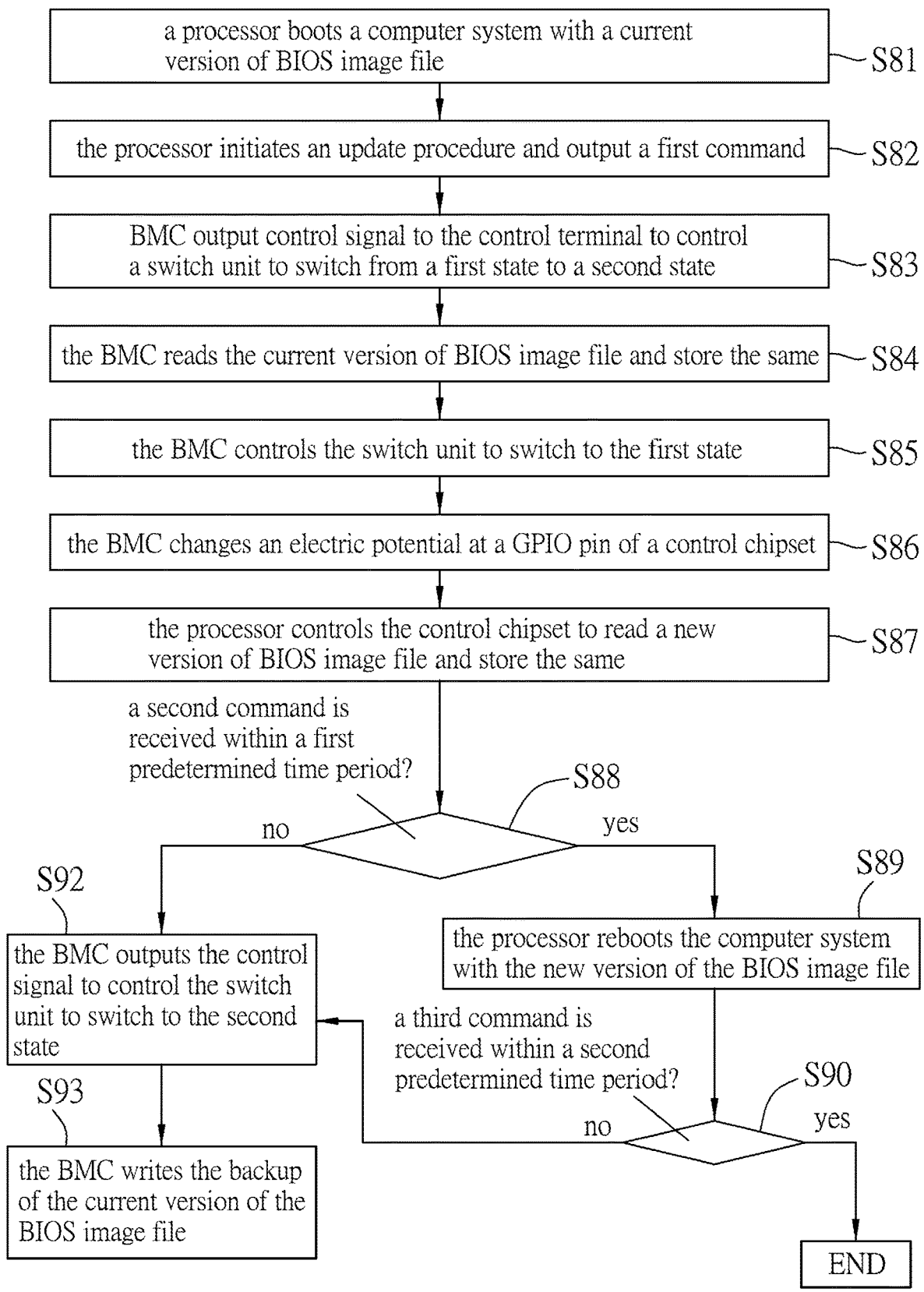
FIG. 2 is a flow chart illustrating a method for recovering a BIOS image file of the computer system of FIG. 1 according to an embodiment of the present disclosure.

Further referring to FIG. 2, a method for recovering the BIOS image file of the computer system 10 according to an embodiment of the present disclosure is illustrated. Note that the switch unit 4 operates in the first state by default when the computer system 10 is booted up.

In step S81, the processor 5 boots the computer system 10 with the current version of the BIOS image file (B1) read from the flash memory 2 via the control chipset 3.

When the processor 5 receives the external updating command indicating that the BIOS image file is to be updated, in step S82, the processor 5 initiates an update procedure for updating the BIOS image file stored in the flash memory 2 and outputs the first command (I1) to be received by the BMC 6 via the control chipset 3 in order to notify the BMC 6 that the current version of BIOS image file (B1) is about to be updated. The BMC 6 subsequently performs a backup procedure (i.e., steps S83 to S86) for the current version of the BIOS image file (B1).

In step S83, the BMC 6 outputs, in response to receipt of the first command (I1), the control signal (C1) to the control terminal of the switch unit 4 so as to control the switch unit 4 to switch from the first state to the second state. When the switch unit 4 is switched to the second state, the switch unit 4 electrically connects the flash memory 2 and the BMC 6 and electrically disconnects the flash memory 2 from the control chipset 3. Accordingly, the update procedure is temporarily interrupted, and the flash memory 2 is accessible by the BMC 6.

In this embodiment, the control signal (C1) is a pulse signal, enables the switch unit 4 to switch to the first state when a logic level thereof is high, and enables the switch unit 4 to switch to the second state when the logic level thereof is low. The control signal (C1) can be other signals capable of switching the switch unit 4 between the first and second states in other embodiments of this disclosure.

In step S84, the BMC 6 reads the current version of the BIOS image file (B1) from the flash memory 2 through the switch unit 4 so as to store the same in the memory 61 of the BMC 6 as a backup. For example, in one embodiment, the BMC 6 is capable of determining a model of the flash memory 2 so as to obtain information such as storage capacity of the flash memory 2, and the BMC 6 reads data stored in the flash memory 2 sequentially from a first section of the flash memory 2 to a last section of the flash memory 2. Once the BMC 6 reads the last section of the flash memory 2 and stores data thus read in the memory 61, the BMC 6 determines that the current version of the BIOS image file (B1) is completely stored in the memory 61 of the BMC 6. After the current version of the BIOS image file (B1) is completely stored in the memory 61, the BMC 6 implements steps S85 and S86.

In step S85, the BMC 6 generates and outputs the control signal (C1) (e.g., at logic high level) again so as to control the switch unit 4 to switch from the second state to the first state. At this time, the switch unit 4 electrically connects the flash memory 2 and the control chipset 3 and electrically disconnects the flash memory 2 from the BMC 6.

In step S86, the BMC 6 changes an electric potential at the GPIO pin 30 of the control chipset 3 so as to notify the processor 5 that the current version of the BIOS image file (B1) has been completely copied and stored as a backup in the memory 61 of the BMC 6. For example, the BMC 6 changes the electric potential at the GPIO pin 30 from logic high level to logic low level.

When the processor 5 detects a change in the electric potential at the GPIO pin 30, in step S87, the processor 5 continues the update procedure and controls the control chipset 3 to read the new version of the BIOS image file (NB) from the storage device 1 and to store the new version of the BIOS image file (NB) in the flash memory 2 to overwrite the current version of the BIOS image file (B1). In one embodiment, the new version of the BIOS image file (NB) stored in the storage device 1 is divided into a plurality of data portions, and the control chipset 3 sequentially and respectively stores the data portions in the sections of the flash memory 2. After the control chipset 3 stores the data portion in each section of the flash memory 2, the processor 5 compares the data stored in said section of the flash memory 2 with a corresponding data portion of the new version of the BIOS image file (NB). When the processor 5 determines that the data stored in said section is identical to the corresponding data portion of the new version of the BIOS image file (NB), the processor 5 controls the control chipset 3 to store a next data portion of the new version of the BIOS image file (NB) in a next section of the flash memory 2. The processor 5 determines that the BIOS image file is successfully updated to the new version of the BIOS image file (NB) when the data stored in all of the sections of the flash memory 2 respectively conform with all corresponding data portions of the new version of the BIOS image file (NB).

After the BIOS image file stored in the flash memory 2 is successfully updated to the new version of the BIOS image file (NB), the processor 5 outputs a second command (I2) to the BMC 6 through the transmission interface. In step S88, the BMC 6 determines whether the second command (I2) that is outputted by the processor 5 is received within a first predetermined time period. When it is determined in step S88 that the second command (I2) is not received within the first predetermined time period, the flow of the method goes to step S92; otherwise, the flow goes to step S89. The first predetermined time period is a time period that the BMC 6 generally requires from the time that the BMC 6 changes the electric potential at the GPIO pin 30 of the control chipset 3 (i.e., from logic high level to logic low level) to the time that the current version of the BIOS image file (B1) is completely updated with the new version of the BIOS image file (NB). For example, the first predetermined time period is six minutes in a case that the flash memory 2 has a storage capacity of 32 mega byte (MB). Note that the first predetermined time period may range from five minutes to twenty minutes according to the storage capacity of the flash memory and the present disclosure is not limited to this example.

When it is determined in step S88 that the second command (I2) is not received within the first predetermined time period, it means that the BIOS image file (B1) is not successfully updated. In step S92, the BMC 6 outputs the control signal (C1) to control the switch unit 4 to switch from the first state to the second state. Subsequently, in step S93, the BMC 6 writes the BIOS image file stored in the memory 61, i.e., the backup of the current version of the BIOS image file (B1), into the flash memory 2. As a result of execution of step S93, the BIOS image file stored in the flash memory 2 is recovered to a version that is exactly the same as the version before the update procedure. Note that after the BMC 6 writes the BIOS image file stored in the memory 61 in the flash memory 2, the processor 5 may reboot the computer system 10 with the current version of the BIOS image file (B1).

Figure 3:
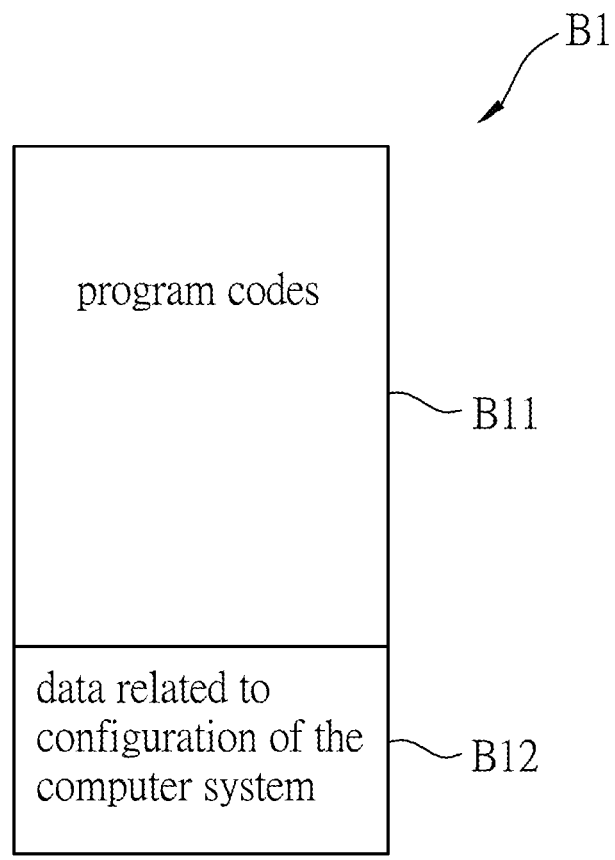
FIG. 3 is a schematic diagram illustrating the BIOS image file including first and second segments that respectively have program codes and data related to configuration of the computer system.

It should be noted that the current version the BIOS image file (B1) includes a first segment (B11) and a second segment (B12) (see FIG. 3). The first segment (B11) has program codes for booting up the computer system 10, and the second segment (B12) has data related to configuration of the computer system 10 set by a user (i.e., a booting configuration of the computer system 10). Accordingly, when the update procedure for updating the BIOS image file stored in the flash memory 2 fails, the BIOS image file stored in the flash memory 2 can be recovered to the version that is exactly the same as the version before the update procedure (i.e., the current version of the BIOS image file (B1) stored in the BMC 6), and thus, the computer system 10 can be booted using the current version of the BIOS image file (B1) with the configuration thereof remaining unchanged.

When it is determined in step S88 that the second command (I2) is received within the first predetermined time period, it means that the BIOS image file (B1) has been successfully updated. In step S89, the processor 5 reboots the computer system 10 with the new version of the BIOS image file (NB) read from the flash memory 2 via the control chipset 3. Subsequently, in step S90, the BMC 6 determines whether a third command (I3) that is outputted by the processor 5 when the computer system 10 is successfully rebooted is received within a second predetermined time period. When the determination made in step S90 is affirmative, the flow of the method terminates; otherwise, the flow goes to step S92. That is to say, when the computer system 10 is not successfully rebooted within the second predetermined time period, it means that the new version of the BIOS image file (NB) might be damaged, and the computer system 10 needs to be recovered to the version that is exactly the same as the version before the update procedure.

In this embodiment, the third command (I3) is an IPMI command outputted by the processor 5 after the computer system 10 is successfully rebooted with the new version of the BIOS image file (NB). The second predetermined time period is a time period that the processor 5 generally requires for rebooting the computer system 10 and outputting the third command (I3) to the BMC 6. For example, the second predetermined time period ranges from five minutes to twenty minutes and the present disclosure is not limited in this respect.

Figure 4:
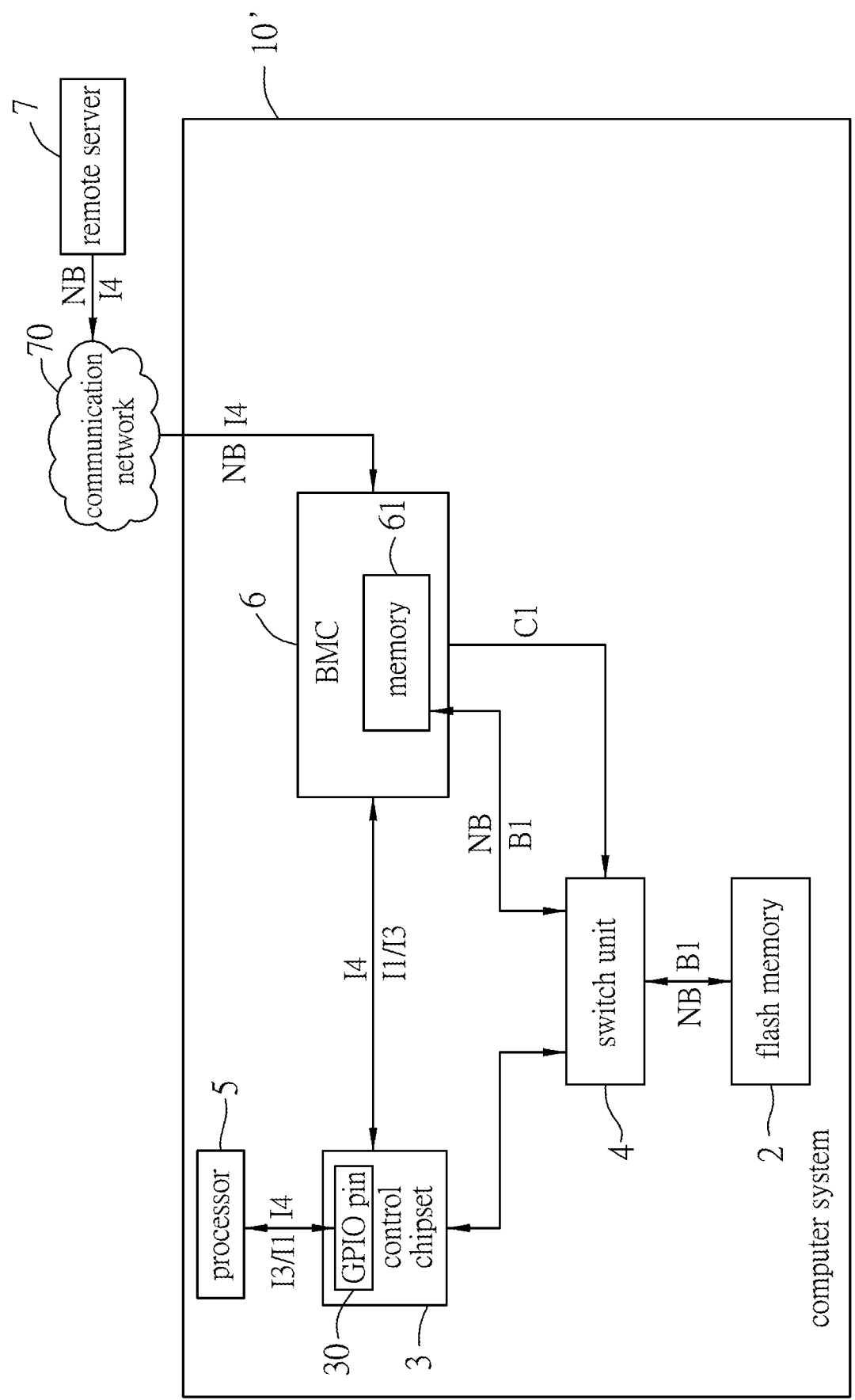
FIG. 4 is a computer system according to another embodiment of the present disclosure.

Referring to FIG. 4, a computer system 10' according to another embodiment of this disclosure similar to the computer system 10 of FIG. 1 is illustrated. The difference between the computer system 10 and the computer system 10' resides in the following. In this embodiment, the BMC 6 of the computer system 10' communicates with a remote server 7 that stores the new version of the BIOS image file (NB) via a communication network 70, and the storage device 1 of FIG. 1 is omitted. When the BIOS image file is to be updated, the remote server 7 is configured to transmit a fourth command (I4) to the processor 5 via the BMC 6 through the communication network 70. For example, the computer system 10' communicates with the remote server 7 in accordance with IPMI specifications.

Figure 5:
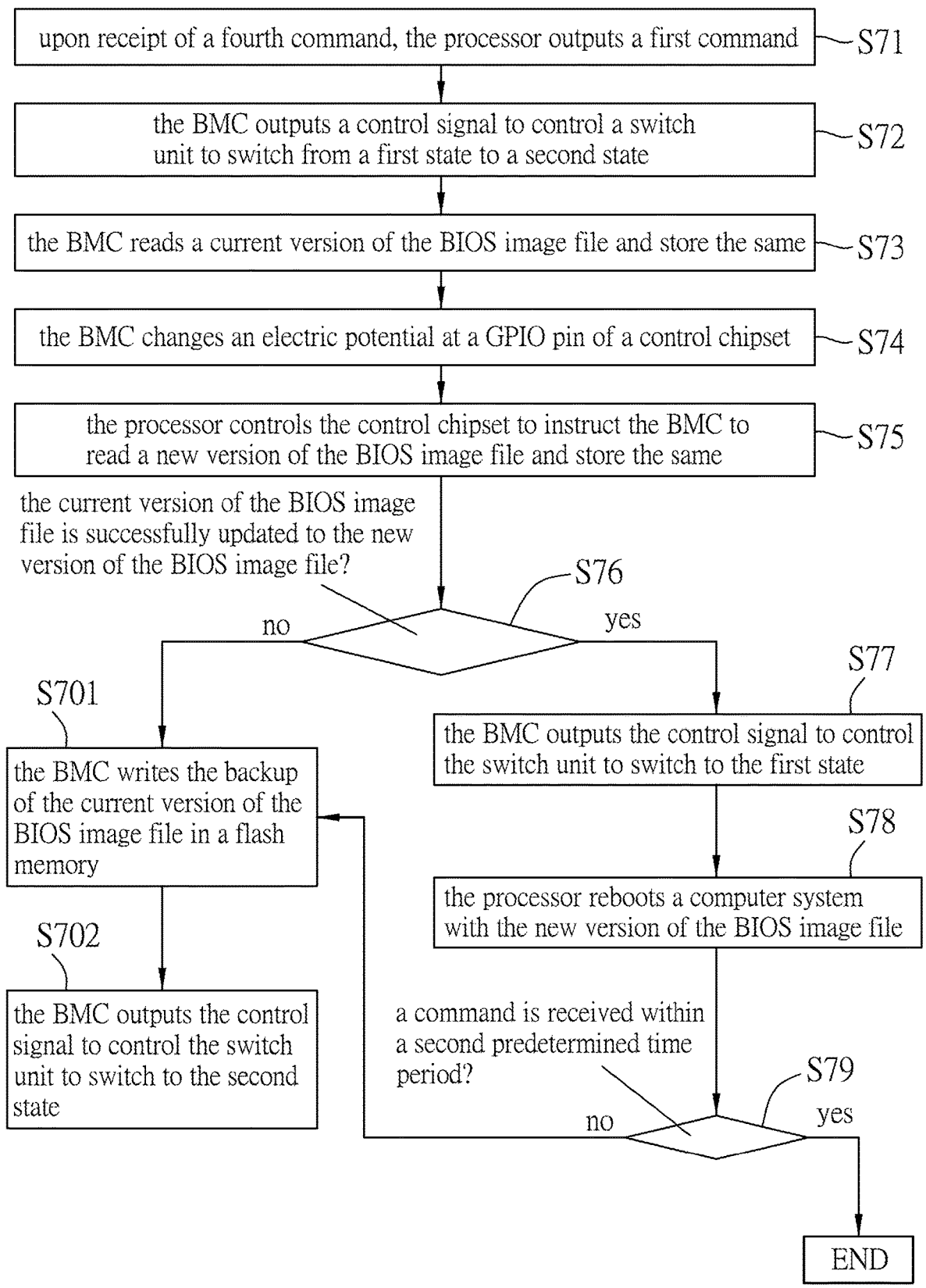
FIG. 5 is a flow chart illustrating a method for recovering a BIOS image file of the computer system of FIG. 4 according to another embodiment of the present disclosure.

Further referring to FIG. 5, a method for recovering the BIOS image file of the computer system 10' according to another embodiment of this disclosure is illustrated. Upon receipt of the fourth command (I4), in step S71, the processor 5 initiates an update procedure for updating the BIOS image file stored in the flash memory 2 and outputs the first command (I1) to the BMC 6 to notify the BMC 6 that the current version of BIOS image file (B1) is to be updated.

Upon receipt of the first command (I1) from the processor 5, in step S72, the BMC 6 outputs the control signal (C1) to the switch unit 4 so as to control the switch unit 4 to switch from the first state to the second state. In step S73, the BMC 6 reads the current version of the BIOS image file (B1) from the flash memory 2 through the switch unit 4 so as to store the same in the memory 61 of the BMC 6 as a backup. After the current version of the BIOS image file (B1) is completely copied and stored as a backup in the memory 61 in step S73, the flow proceeds to step S74.

In step S74, the BMC 6 changes an electric potential at the GPIO pin 30 of the control chipset 3 so as to notify the processor 5 that the current version of the BIOS image file (B1) has been completely stored in the memory 61 of the BNC 6.

When the processor 5 detects a change in the electric potential at the GPIO pin 30, in step S75, the processor 5 controls the control chipset 3 to instruct the BNC 6 to start updating the BIOS image file, so that the BMC 6 reads the new version of the BIOS image file (NB) from the remote server 7 and stores the new version of the BIOS image file (NB) in the flash memory 2 via the switch unit 4 to overwrite the current version of the BIOS image file (B1). Note that in this embodiment, the switch unit 4 is still in the second state in this step.

In step S76, the BMC 6 determines whether the current version of the BIOS image file (B1) store in the flash memory 2 is successfully updated to the new version of the BIOS image file (NB). When the determination made in step S76 is affirmative, the flow of this method goes to S77; otherwise, the flow goes to step S701. Note that the determination procedure of whether the BIOS image file is successfully updated to the new version of the BIOS image file (NB) is similar to those described in the embodiment shown in FIGS. 1 and 2, and is thus omitted herein for the sake of brevity.

In step S701, the BMC 6 writes the BIOS image file stored in the memory 61, i.e., the backup of the current version of the BIOS image file (B1), into the flash memory 2. As a result of execution of step S701, the BIOS image file stored in the flash memory 2 is recovered to a version that is exactly the same as the version before the update procedure. By this way, the processor 5 may reboot the computer system 10' with the current version of the BIOS image file (B1).

In step S77, the BMC 6 outputs the control signal (C1) to the control terminal of the switch unit 4 to switch the switch unit 4 from the second state to the first state. In step S78, the processor 5 reboots the computer system 10' with the new version of the BIOS image file (NB) read from the flash memory 2 via the control chipset 3 and the switch unit 4.

In step S79, the BMC 6 determines whether the command (I3) that is outputted by the processor 5 when the computer system 10' is successfully rebooted is received within the second predetermined time period. When the determination made in step S79 is affirmative, the flow of the method terminates; otherwise, the flow goes to step 702.

In step 702, the BMC 6 outputs the control signal (C1) to control the switch unit 4 to switch from the first state to the second state. Subsequently, the flow goes to step 701, in which the BMC 6 writes the current version of the BIOS image file (B1) stored therein into the flash memory 2.

To sum up, some advantages of the present disclosure are described in the following. When the processor 5 receives an updating command indicating that the BIOS is to be updated, the BMC 6 performs a backup procedure for the current version of the BIOS image file (B1) before storing of the new version of the BIOS image file (NB), such that the BIOS image file in the flash memory 2 can be recovered to a version that is exactly the same as the version before the update procedure. Further, this recovery procedure will be automatically performed whenever a BIOS image file is about to be updated. Also, it is not required to have a maintenance technician to manually recover the BIOS image file on site as compared to the methods for recovering BIOS image file of a computer system described in the "BACKGROUND" section.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A method for recovering a basic input/output system (BIOS) image file of a computer system, the computer system including a flash memory for storing a current version of the BIOS image file, a processor, a baseboard management controller (BMC), a control chipset electrically connected between the processor and the BMC, and a switch unit electrically connected among the flash memory, the control chipset and the BMC, the method comprising steps of:
   once the BIOS image file is to be updated, in order to notify the BMC that the current version of the BIOS image file is to be updated, outputting, by the processor, a first command to be received by the BMC via the control chipset; and
   upon receipt of the first command:
      controlling, by the BMC, the switch unit to switch from a first state to a second state, the switch unit being in the first state by default and electrically connecting the flash memory and the control chipset and electrically disconnecting the flash memory from the BMC in the first state, the switch unit electrically connecting the flash memory and the BMC and electrically disconnecting the flash memory from the control chipset in the second state;
      reading and copying, by the BMC, the current version of the BIOS image file from the flash memory so as to store the same in the BMC as a backup;
      after the current version of the BIOS image file is stored in the BMC, controlling, by the BMC, the switch unit to switch from the second state to the first state;
      determining, by the BMC, whether a second command that is outputted by the processor when the BIOS image file stored in the flash memory is successfully updated to a new version of the BIOS image file is received within a first predetermined time period; and
      when it is determined that the second command is not received within the first predetermined time period, controlling, by the BMC, the switch unit to switch from the first state to the second state and writing the current version of the BIOS image file stored therein into the flash memory.

2. The method as claimed in claim 1, further comprising steps of:
   when the BIOS image file stored in the flash memory is successfully updated to the new version of the BIOS image file, rebooting, by the processor, the computer system with the new version of the BIOS image file read from the flash memory via the control chipset;
   determining, by the BMC, whether a third command that is outputted by the processor when the computer system is successfully rebooted is received within a second predetermined time period;
   when it is determined that the third command is not received within the second predetermined time period, by the BMC, controlling the switch unit to switch from the first state to the second state and writing the current version of the BIOS image file stored therein into the flash memory.

3. The method as claimed in claim 1, the control chipset including a general purpose input output (GPIO) pin electrically connected to the processor, wherein the method further comprises a step of:
   after the step of controlling the switch unit to switch from the second state to the first state, changing, by the BMC, an electric potential at the GPIO pin so as to notify the processor that the current version of the BIOS image file has been stored in the BMC.

4. The method as claimed in claim 3, further comprising a step of:
   controlling, by the processor, the control chipset to read the new version of the BIOS image file from a storage device that is electrically connected the control chipset and to store the new version of the BIOS image file in the flash memory to overwrite the current version of the BIOS image file when the processor detects a change in the electric potential at the GPIO pin.

5. The method as claimed in claim 1, wherein the BIOS image file includes a first segment having program codes for booting up the computer system, and a second segment having data related to configuration of the computer system.

6. A method for recovering a basic input/output system (BIOS) image file of a computer system, the computer system communicating with a remote server that stores a new version of the BIOS image file via a communication network, and including a flash memory for storing a current version of the BIOS image file, a processor, a baseboard management controller (BMC), a control chipset electrically connected between the processor and the BMC, and a switch unit electrically connected among the flash memory, the control chipset and the BMC, the method comprising steps of:
   upon receiving notification that the current version of the BIOS image data of the computer system is to be updated:
      controlling, by the BMC, the switch unit to switch from a first state to a second state, the switch unit being in the first state by default and electrically connecting the flash memory and the control chipset and electrically disconnecting the flash memory from the BMC in the first state, the switch unit electrically connecting the flash memory and the BMC and electrically disconnecting the flash memory from the control chipset in the second state;
      reading and copying, by the BMC, the current version of the BIOS image file from the flash memory so as to store the same in the BMC as a backup;
      reading, by the BMC, the new version of the BIOS image file from the remote server so as to store the new version of the BIOS image file in the flash memory to overwrite the current version of the BIOS image file;

determining, by the BMC, whether the BIOS image file stored in the flash memory is successfully updated to the new version of the BIOS image file; and when it is determined that the BIOS image file stored in the flash memory is not successfully updated, writing, by the BMC, the current version of the BIOS image file stored therein into the flash memory.

7. The method as claimed in claim 6, the control chipset including a general purpose input output (GPIO) pin electrically connected to the processor, wherein the method further comprises a step, between the step of reading the current version of the BIOS image file and the step of reading the new version of the BIOS image file, of:

changing, by the BMC, an electric potential at the GPIO pin so as to notify the processor that the current version of the BIOS image has been stored in the BMC.

8. The method as claimed in claim 7, further comprising a step of:

controlling, by the processor, the control chipset to notify the BMC to implement the step of reading the new version of the BIOS image file from the remote server when the processor detects a change in the electric potential at the GPIO pin.

9. The method as claimed in claim 6, the method further comprising steps of:

when it is determined that the BIOS image file stored in the flash memory is successfully updated to the new version of the BIOS image file, controlling, by the BMC, the switch unit to switch from the second state to the first state;

rebooting, by the processor, the computer system with the new version of the BIOS image file read from the flash memory via the control chipset;

determining, by the BMC, whether a command that is outputted by the processor when the computer system is successfully rebooted is received within a predetermined time period; and when it is determined that the command is not received within the predetermined time period, by the BMC, controlling the switch unit to switch from the first state to the second state and writing the current version of the BIOS image file stored therein into the flash memory.

10. A computer system comprising:

a flash memory storing a current version of a basic input/output system (BIOS) image file of said computer system;

a control chipset configured to be electrically connected to a storage device that stores a new version of the BIOS image file;

a processor electrically connected to said control chipset, and configured to output a first command to notify that the current version of the BIOS image file is to be updated once the BIOS image file is to be updated;

a switch unit including a first terminal electrically connected to said flash memory, a second terminal electrically connected to said control chipset, a third terminal, and a control terminal, said switch unit being operable to switch between a first state, in which said first terminal and said second terminal are conducted, and a second state, in which said first terminal and said third terminal are conducted, said switch unit being configured to operate in the first state by default; and a baseboard management controller (BMC) electrically connected to said third terminal and said control terminal of said switch unit, electrically connected to said control chipset through a transmission interface therebetween, and configured to output a control signal to said control terminal so as to control said switch unit to switch between the first state and the second state, wherein, upon receipt of a first command from said processor through said control chipset and the transmission interface, said BMC outputs the control signal to said control terminal to control said switch unit to switch from the first state to the second state for electrically connecting said flash memory and said BMC and electrically disconnecting said flash memory from said chipset, and reads the current version of the BIOS image file from said flash memory so as to store the same therein as a backup, wherein, after the current version of the BIOS image file is stored in the BMC, said BMC outputs the control signal to said control terminal to control said switch unit to switch from the second state to the first state for electrically connecting said flash memory and said control chipset and electrically disconnecting the flash memory from the BMC, and said processor controls said control chip set to read the new version of the BIOS image file from the storage device and to store the new version of the BIOS image file in the flash memory to overwrite the current version of the BIOS image file, wherein, when the BIOS image file stored in the flash memory is not successfully updated, said BMC outputs the control signal to said control terminal to control said switch unit to switch from the first state to the second state, and writes the current version of the BIOS image file stored in said BMC into said flash memory.

11. The computer system as claimed in claim 10, wherein said BMC includes a memory configured to store the current version of the BIOS image file read from said flash memory.

12. The computer system as claimed in claim 10, wherein said control chipset includes a general purpose input output (GPIO) pin electrically connected to said processor, and after the current version of the BIOS image file is stored in the BMC, said BMC further changes an electric potential at said GPIO pin so as to notify the processor that the current version of the BIOS image file has been stored in the BMC.

13. The computer system as claimed in claim 12, wherein said processor controls said control chip set to read the new version of the BIOS image file from the storage device and to store the new version of the BIOS image file in said flash memory to overwrite the current version of the BIOS image file when said processor detects change in the electric potential at said GPIO pin.

14. The computer system as claimed in claim 10, wherein said processor is further configured to output a second command to said BMC when the BIOS image file stored in the flash memory is successfully updated to the new version of the BIOS image file, and said BMC determines that the BIOS image file stored in the flash memory is successfully updated when receiving the second command within a first predetermined time period and determines that the BIOS image file stored in the flash memory is not successfully updated when otherwise.

15. The computer system as claimed in claim 14, wherein said processor is configured to reboot said computer system with the new version of the BIOS image file when the BIOS image data stored in said flash memory is successfully updated to the new version, wherein said BMC is configured to determine whether a third command that is outputted by said processor when said computer system is successfully rebooted is received within a second predetermined time period, and when not receiving the third command from the processor within the second predetermined time period, output the control signal to said control terminal so as to control said switch unit to switch from the first state to the second state and write the current version of the BIOS image file stored in said BMC into said flash memory.

\* \* \* \* \*

UNITED STATES PATENT AND TRADEMARK OFFICE
CERTIFICATE OF CORRECTION

PATENT NO. : 10,860,425 B2  Page 1 of 1
APPLICATION NO. : 15/971118
DATED : December 8, 2020
INVENTOR(S) : Shun-Chieh Yang It is certified that error appears in the above-identified patent and that said Letters Patent is hereby corrected as shown below:

In the Claims

In Column 12, Claim 10, Line 23, delete "chip set" and insert in its place --chipset--.

In Column 12, Claim 13, Line 45, delete "chip set" and insert in its place --chipset--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*